(12) United States Patent
Chakraborty

(10) Patent No.: US 11,080,747 B2
(45) Date of Patent: Aug. 3, 2021

(54) METHOD AND APPARATUS FOR SELECTING TREATMENT FOR VISITORS TO ONLINE ENTERPRISE CHANNELS

(71) Applicant: [24]7.ai, Inc., San Jose, CA (US)

(72) Inventor: Abir Chakraborty, Bangalore (IN)

(73) Assignee: [24]7.ai, Inc., San Jose, CA (US)

( * ) Notice: Subject to any disclaimer, the term of this patent is extended or adjusted under 35 U.S.C. 154(b) by 234 days.

(21) Appl. No.: 16/274,855

(22) Filed: Feb. 13, 2019

(65) Prior Publication Data

US 2019/0259058 A1    Aug. 22, 2019

Related U.S. Application Data

(60) Provisional application No. 62/633,007, filed on Feb. 20, 2018.

(51) Int. Cl.
*G06Q 30/00* (2012.01)
*G06Q 30/02* (2012.01)
(Continued)

(52) U.S. Cl.
CPC ..... *G06Q 30/0254* (2013.01); *G06Q 30/0253* (2013.01); *G06Q 30/0255* (2013.01);
(Continued)

(58) Field of Classification Search
CPC .......... G06Q 30/0249; G06Q 30/0253; G06Q 30/0254; G06Q 30/0255; G06Q 30/0269;
(Continued)

(56) References Cited

U.S. PATENT DOCUMENTS 6,934,748 B1 * 8/2005 Louviere ............... G06Q 30/02
709/224
10,038,786 B2 * 7/2018 Kannan ................. H04L 51/32
(Continued)

OTHER PUBLICATIONS

Zhou, Ke., et al. "Predicting Pre-click Quality for Native Advertisements." International World Wide Web Conference, WWW 2016, Apr. 11-15, 2016, Montreal, Quebec, Canada. (Year: 2016).*
(Continued)

*Primary Examiner* — Luis A Brown
(74) *Attorney, Agent, or Firm* — Perkins Coie LLP; Michael Glenn

(57) ABSTRACT

A method and apparatus for selecting treatment for visitors to online enterprise channels are disclosed. The method includes receiving information related to a visitor and a current activity of the visitor on an online enterprise channel. The information is transformed to generate transformed data and a plurality of features is extracted from the transformed data. Using the plurality of features, it is determined whether a treatment when rendered to the visitor is capable of increasing a likelihood of the visitor performing a desired action during a current visit to the online enterprise channel. The treatment is selected and rendered if it is determined that the treatment is capable of increasing the likelihood of the visitor performing the desired action. No treatment is rendered if it is determined that no treatment from among the plurality of treatments is capable of increasing the likelihood of the visitor performing the desired action.

16 Claims, 8 Drawing Sheets

(51) Int. Cl.
*H04L 12/58* (2006.01)
*H04L 29/08* (2006.01)

(52) U.S. Cl.
CPC ..... *G06Q 30/0269* (2013.01); *G06Q 30/0271* (2013.01); *G06Q 30/0277* (2013.01); *H04L 51/04* (2013.01); *H04L 67/22* (2013.01)

(58) Field of Classification Search
CPC ........... G06Q 30/0271; G06Q 30/0276; G06Q 30/0277; G06Q 30/0207–0277; H04L 51/04; H04L 51/32; H04L 67/22
See application file for complete search history.

(56) References Cited

U.S. PATENT DOCUMENTS

| | | | |
|---|---|---|---|
| 10,089,639 B2 * | 10/2018 | Kannan | G06F 16/958 |
| 10,269,028 B2 | 4/2019 | Vratskides | G06F 40/00 |
| 10,311,377 B2 * | 6/2019 | Vijayaraghavan | G06N 5/02 |
| 10,311,443 B2 * | 6/2019 | Monegan | G06Q 30/016 |
| 10,339,534 B2 * | 7/2019 | Chang | G06Q 10/107 |
| 10,372,782 B1 * | 8/2019 | Masterman | G06F 16/9577 |
| 10,417,643 B2 * | 9/2019 | Sri | G06Q 30/016 |
| 10,467,854 B2 * | 11/2019 | Sri | G06Q 10/107 |
| 10,574,824 B2 * | 2/2020 | Kannan | H04M 3/5166 |
| 10,579,834 B2 * | 3/2020 | Walia | G06F 40/35 |
| 10,592,949 B2 * | 3/2020 | Kannan | G06Q 30/016 |
| 10,832,283 B1 * | 11/2020 | Angelopoulos | G06N 20/00 |
| 2013/0238251 A1 * | 9/2013 | Zhu | G06K 9/6262 |
| | | | 702/19 |
| 2014/0019886 A1 * | 1/2014 | Kannan | H04L 51/04 |
| | | | 715/758 |
| 2014/0207622 A1 * | 7/2014 | Vijayaraghavan | G06F 16/951 |
| | | | 705/26.62 |
| 2014/0249873 A1 * | 9/2014 | Stephan | G06Q 10/063 |
| | | | 705/7.11 |
| 2015/0332308 A1 * | 11/2015 | Liu | G06Q 30/0242 |
| | | | 705/14.41 |
| 2016/0078456 A1 * | 3/2016 | Chakraborty | G06Q 30/0204 |
| | | | 705/7.31 |
| 2016/0217515 A1 * | 7/2016 | Vijayaraghavan | |
| | | | G06Q 30/0631 |
| 2016/0239897 A1 * | 8/2016 | Ghose | H04L 67/02 |
| 2017/0140428 A1 * | 5/2017 | Chakraborty | H04L 67/02 |
| 2019/0043093 A1 * | 2/2019 | Litvak | G06Q 30/0276 |
| 2019/0043094 A1 * | 2/2019 | Litvak | G06Q 30/0283 |
| 2019/0043483 A1 * | 2/2019 | Chakraborty | G06N 3/006 |
| 2019/0080351 A1 * | 3/2019 | Garg | G06Q 30/0253 |
| 2019/0156838 A1 * | 5/2019 | Kannan | G10L 15/22 |
| 2019/0259036 A1 * | 8/2019 | Chakraborty | G06N 3/08 |
| 2019/0259058 A1 * | 8/2019 | Chakraborty | G06Q 30/0254 |
| 2019/0295122 A1 * | 9/2019 | Kumar | G06Q 30/0244 |
| 2019/0340658 A1 * | 11/2019 | Udupa | G06Q 30/016 |
| 2020/0098366 A1 * | 3/2020 | Chakraborty | G10L 15/1815 |
| 2020/0302486 A1 * | 9/2020 | Ayoub | G06N 20/00 |

OTHER PUBLICATIONS

Lee, Kuang-chih., et al. "Estimating Conversion Rate in Display Advertising from Past Performance Data." Turn, Inc., KDD 2012, Aug. 12-16, 2-12, Beijing, China. (Year: 2012).*

Xu, David Jingiun., et al. "Combining Empirical Experimentation and Modeling Techniques: A Design Research for Personalized Mobile Advertising Applications." Science Direct: Decision Support Systems vol. 44 (2008) pp. 710-724. Available online Oct. 13, 2007. (Year: 2007).*

Wang, Jun, et al. "Display Advertising with Real-Time Bidding (RTB) and Behavioural Targeting." University College London, Jul. 18, 2007. (Year: 2007).*

* cited by examiner

METHOD AND APPARATUS FOR SELECTING TREATMENT FOR VISITORS TO ONLINE ENTERPRISE CHANNELS

CROSS REFERENCE TO RELATED APPLICATIONS

This application claims priority to U.S. provisional patent application Ser. No. 62/633,007 filed Feb. 20, 2018, which is incorporated herein in its entirety by this reference thereto.

TECHNICAL FIELD

The present invention generally relates to content displayed to visitors on online enterprise channels, and more particularly to a method and apparatus for selecting treatment for visitors to online enterprise channels.

BACKGROUND

Online enterprise channels, such as the enterprise Website and enterprise social media portals, display enterprise products and/or services and routinely attract many visitors. Existing or potential customers of the enterprise visiting online enterprise channels are referred to as online visitors or simply as 'visitors.'

The enterprises attempt to engage with the visitors and, in general, provide an enriched experience to the visitors to enhance chances of sale or to improve the likelihood of the visitors visiting the online enterprise channels again.

Currently, an intention of the visitor to make a purchase on the Website or to click on an advertisement (also referred to herein as 'ad') during the visitor's current visit to the Website is predicted. Typically, an agent assistance is offered to the visitor to influence the online visitor to take certain desired action, such as for example, to click on Ad, to engage in a purchase transaction, and the like.

In many example scenarios, some visitors would have performed the desired action, such as making the purchase transaction or clicking on the ad, irrespective of the treatment provided to them on the online enterprise channel. Display of banner ads or display of offers to interact with enterprise agents may annoy such visitors. On the other end, there are visitors, who would not engage in performing the desired action irrespective of the treatment provided to them on the online enterprise channel. Targeting such visitors with treatment may not yield any benefit and may even annoy the visitors, who may choose to never visit the online enterprise channel again, leading to a loss of revenue for the enterprise.

Accordingly, there is a need to select the appropriate treatment for each visitor to provide an enriched experience of visiting online enterprise channels. It is also advantageous not to offer treatment to a visitor if the treatment cannot elicit the desired action from the visitor.

SUMMARY

In an embodiment of the invention, a computer-implemented method for selecting treatment for visitors to online enterprise channels is disclosed. The method receives, by a processor, information related to a visitor and a current activity of the visitor on an online enterprise channel in substantially real-time. The method transforms the received information, by the processor, to generate transformed data corresponding to the visitor and the current activity of the visitor on the online enterprise channel. The method extracts, by the processor, a plurality of features from the transformed data. The method, using the plurality of features, determines by the processor, whether a treatment from among a plurality of treatments when rendered to the visitor is capable of increasing a likelihood of the visitor performing a desired action during a current visit of the visitor to the online enterprise channel. The method selects, by the processor, the treatment for the visitor if it is determined that the treatment is capable of increasing the likelihood of the visitor performing the desired action during the current visit. The selected treatment is rendered to the visitor during the current visit of the visitor to the online enterprise channel. No treatment is rendered to the visitor during the current visit if it is determined that no treatment from among the plurality of treatments is capable of increasing the likelihood of the visitor performing the desired action.

In an embodiment, an apparatus for selecting treatment for visitors to online enterprise channels is disclosed. The apparatus includes a processor and a memory. The memory stores instructions. The processor is configured to execute the instructions and thereby cause the apparatus to receive information related to a visitor and a current activity of the visitor on an online enterprise channel in substantially real-time. The apparatus transforms the received information to generate transformed data corresponding to the visitor and the current activity of the visitor on the online enterprise channel. The apparatus extracts a plurality of features from the transformed data. The apparatus using the plurality of features, determines whether a treatment from among a plurality of treatments when rendered to the visitor is capable of increasing a likelihood of the visitor performing a desired action during a current visit of the visitor to the online enterprise channel. The apparatus selects the treatment for the visitor if it is determined that the treatment is capable of increasing the likelihood of the visitor performing the desired action during the current visit. The selected treatment is rendered to the visitor during the current visit of the visitor to the online enterprise channel. No treatment is rendered to the visitor during the current visit if it is determined that no treatment from among the plurality of treatments is capable of increasing the likelihood of the visitor performing the desired action.

In an embodiment of the invention, another computer-implemented method for selecting treatment for visitors to online enterprise channels is disclosed. The method receives, by a processor, information related to a visitor and a current activity of the visitor on an online enterprise channel in substantially real-time. The method transforms the received information, by the processor, to generate transformed data corresponding to the visitor and the current activity of the visitor on the online enterprise channel. The method extracts, by the processor, a plurality of features from the transformed data. The method generates, by the processor, a first probability score based, at least in part, on the plurality of features. The first probability score is indicative of a probability of the visitor engaging in a purchase transaction during a current visit of the visitor to the online enterprise channel when rendered agent assistance. The method generates, by the processor, a second probability score based, at least in part, on the plurality of features. The second probability score is indicative of a probability of the visitor engaging in the purchase transaction during the current visit when the visitor is not rendered the agent assistance. The method compares, by the processor, a difference between the first probability score and the second probability score with a predefined threshold value. The method facilitates, by the processor, a rendering of the agent assistance to the visitor during the current visit of the visitor to the online enterprise channel if it is determined that the agent assistance is capable of increasing the likelihood of the visitor engaging in the purchase transaction during the current visit. The agent assistance is not rendered to the visitor during the current visit if it is determined that the agent assistance is incapable of increasing the likelihood of the visitor engaging in the purchase transaction.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
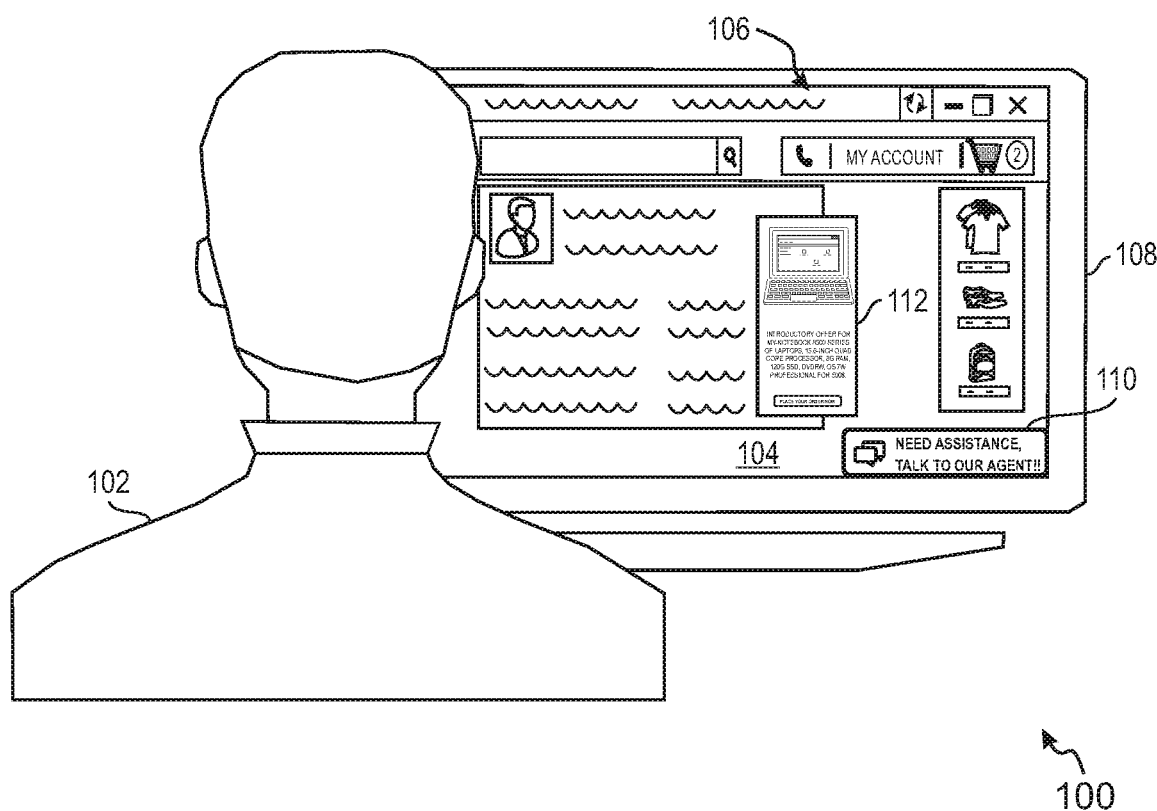
FIG. 1 shows a representation for illustrating an example interaction between a visitor and an enterprise in accordance with an example scenario.

FIG. 1 shows a representation 100 for illustrating an example interaction between an online user and an enterprise, in accordance with an example scenario. More specifically, the representation 100 depicts an online user 102 (hereinafter referred to as a visitor 102) accessing an enterprise Website 104 using a Web browser application 106 installed on a desktop computer 108. The enterprise Website 104 (hereinafter referred to as a Website 104) may be hosted on a remote Web server and the Web browser application 106 may be configured to retrieve one or more Web pages associated with the Website 104 from the remote Web server over a communication network (not shown in FIG. 1). An example of the communication network may include the Internet.

In the representation 100, the Website 104 is exemplarily depicted to be an electronic commerce (E-commerce) Website displaying a variety of products and services for sale to online visitors during their journey on the Website 104. It is noted that the term 'journey' as used throughout the description refers to a path an online visitor, such as the online visitor 102 may take to reach his/her goal when using a particular interaction channel. For example, the online visitor's journey on the Website 104 may include several Web page visits and decision points that carry the online interaction of the visitor 102 from one step to another step.

It is also noted that an enterprise may use various online avenues to offer products, services and/or information to existing and potential customers. Some non-exhaustive examples of such online avenues include the enterprise Website, the enterprise native mobile application, third-party Websites like the social media portals and/or E-commerce Websites, and the like. The various online avenues used by an enterprise for offering enterprise offerings are collectively referred to herein as online enterprise channels and individually as an online enterprise channel. Accordingly, the Website 104 is one example of an online enterprise channel used by an enterprise for offering products, services and/or information to its customers. It is understood that the Website 104 may attract a large number of existing and potential customers of enterprise offerings, such as the visitor 102.

In an example scenario, the activity of the visitor 102 on the Website 104 may be tracked and the tracked information along with other information, such as past activity on the Website 104, previous chat conversations with agents, type of device/browser/OS used for accessing the Website 104, and the like, may be used to determine an intention of the online visitor 102. For example, an intention of the visitor 102 to perform a desired action, such as make a purchase transaction on the Website 104 or click on a banner advertisement may be determined. If it is determined that the visitor 102 will perform the desired action, then an appropriate treatment such as an offer to chat with an agent of an enterprise or an offer to speak with a customer support representative like a human agent or an interactive voice response (IVR) system may be selected and provisioned to the visitor 102 as shown in FIG. 1. More specifically, a widget 110 displaying text 'NEED ASSISTANCE, TALK TO OUR AGENT!!' is displayed on the current UI of the Website 104.

In another example scenario, the historical interaction data of the visitor 102 may indicate the visitor 102 is interested in a particular brand of laptops. Accordingly, relevant content and/or information may be displayed to the visitor 102 on the Website 104 to increase chances of a sale or to provide an improved browsing experience to the online visitor 102. As an illustrative example, a banner advertisement 112 showing a promotional offer on a laptop is displayed on the current UI of the Website 104.

The treatment such as displaying widgets like the widget 110 or banner advertisements, like the banner advertisement 112, is provided to the visitor 102 to influence the visitor 102 to take certain desired action, such as for example, to click on advertisement, to engage in a purchase transaction, and the like.

However, in many example scenarios, some visitors to the Website 104 would have engaged in performing the desired action, such as making the purchase transaction or clicking on the advertisement, irrespective of the treatment provided to them on the online enterprise channel. Display of banner ads or display of offers to interact with enterprise agents may, in fact, annoy such visitors. On the other end, some online visitors would not engage in performing the desired action irrespective of the treatment provided to them on the online enterprise channel. Targeting such visitors with treatment may not yield any benefit and may even annoy the visitors. Such online visitors may not enjoy viewing additional content and may exit the interaction, perhaps never to return. Such negative online visitor experiences are detrimental to enterprise objectives.

Figure 2A:
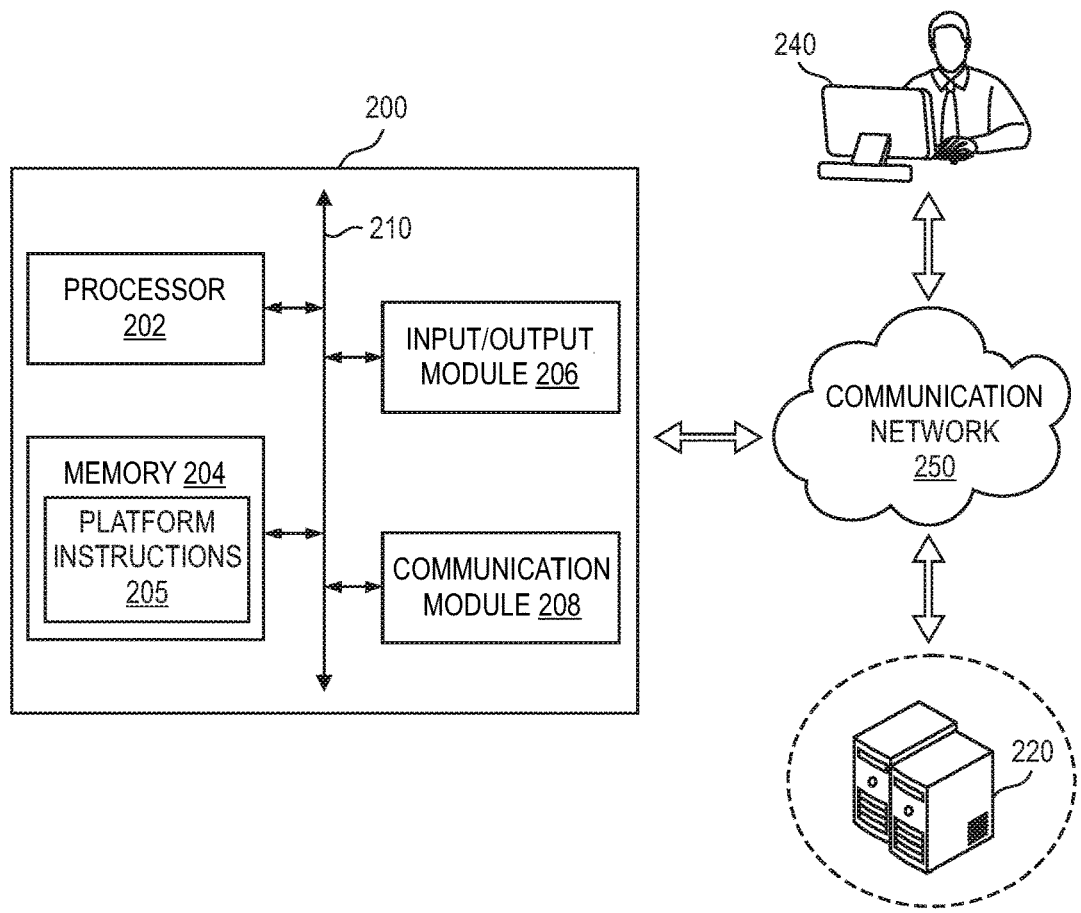
FIG. 2A shows a block diagram of an apparatus configured to select treatment for visitors to online enterprise channels in accordance with an example embodiment.

Various embodiments of the invention provide a method and apparatus that are capable of overcoming these and other obstacles and providing additional benefits. More specifically, various embodiments of the invention disclosed herein present a technique for selecting the appropriate treatment for each visitor to an online enterprise channel to provide an enriched interaction experience to the visitor. Further, the method as disclosed herein suggests selecting a treatment for a visitor only if the treatment can elicit the desired action from the visitor. No treatment is selected for the visitor if it is determined that the desired action cannot be elicited from the visitor by providing treatments to the visitor during the visitor's current visit to the online enterprise channel. An apparatus for selecting treatment for visitors to online enterprise channels is explained with reference to FIG. 2A FIG. 2A shows a block diagram of an apparatus 200 configured to select treatment for visitors to online enterprise channels, in accordance with an example embodiment. In at least one embodiment, the apparatus 200 is embodied as a Web-based or a cloud-based interaction platform configured to enable enterprises to extend support, such as, for example, support in form of agent assistance, to visitors visiting online enterprise channels. The interaction platform may be implemented including a mix of existing open systems, proprietary systems and third-party systems. In another embodiment, the apparatus 200 may be implemented completely as a platform including a set of software layers on top of existing hardware systems. In an embodiment, one or more components of the apparatus 200 may be deployed in a Web Server. In another embodiment, the apparatus 200 may be a standalone component in a remote machine connected to a communication network and capable of executing a set of instructions, sequential and/or otherwise, to select treatment for visitors to online enterprise channels.

As explained with reference to FIG. 1, the term 'online enterprise channels' as used herein implies Web accessible interaction channels, such as the enterprise Website, the enterprise native mobile application and third-party Websites and applications on which the enterprise displays its offering. Some examples of such third-party Websites and applications may include E-commerce sites, social media portals, and the like.

The term 'visitors' as used herein refers to existing and potential users of enterprise offerings, who are currently present on an online enterprise channel. Further the term 'selecting a treatment for visitors to online enterprise channels' as used herein implies selecting a treatment from among several treatment options, such as rendering an automated agent assistance to the visitor, rendering a textual-chat based assistance to the visitor, rendering a voice call interaction with a human agent to the visitor or rendering a display of banner advertisement to the visitor. In some example embodiments, a treatment option may include no intervention during the current visit of the visitor to the online enterprise channel. It is noted that the term 'current visit' as used herein refers includes the current journey of the visitor on the online enterprise channel subsequent to accessing the online enterprise channel. For example, the current visit to the Website may include a visit to one or more Web pages of the Website. Further, a visit to a Web page may also include visitor selection of content, such as selection of images or URLs displayed on the UI of the respective Web page.

The apparatus 200 includes at least one processor, such as a processor 202 and a memory 204. It is noted that although the apparatus 200 is depicted to include only one processor, the apparatus 200 may include a greater number of processors therein. In an embodiment, the memory 204 is capable of storing machine executable instructions, referred to herein as platform instructions 205. Further, the processor 202 is capable of executing the platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices, such as hard disk drives, floppy disks, magnetic tapes, etc.; optical magnetic storage devices, e.g. magneto-optical disks; CD-ROM (compact disc read only memory); CD-R (compact disc recordable); CD-R/W (compact disc rewritable); DVD (Digital Versatile Disc); BD (BLU-RAY® Disc); and semiconductor memories such as mask ROM, PROM (programmable ROM), EPROM (erasable PROM), flash memory, RAM (random access memory), etc.

In at least some embodiments, the memory 204 is configured to include a database (not shown herein) for storing content capable of being displayed on the online enterprise channels. Some non-exhaustive examples of such content include banner advertisements, widgets offering agent support among other content related to promotional offers, discount coupons, and the like. In at least one example embodiment, the memory 204 is configured to store one or more text mining and intention prediction models as classifiers. Some examples of such models include models based on logistic regression, artificial neural network (ANN), Support Vector Machine (SVM) with Platt scaling, and the like.

Further, the memory 204 also stores a predefined threshold value used for determining if a particular treatment is to be provided to the online visitor or not (explained later with reference to FIGS. 2B, 3A and 3B). The predefined threshold value may be defined by the user of the apparatus 200 or may be determined based on learning from previous visitor interaction experiences on the online enterprise channels.

The apparatus 200 also includes an input/output module 206 (hereinafter referred to as an 'I/O module 206') and at least one communication module such as a communication module 208. In an embodiment, the I/O module 206 may include mechanisms configured to receive inputs from and provide outputs to the user of the apparatus 200. For example, the I/O module 206 may enable the user to provide selection of a value of the predefined threshold value for selecting the appropriate treatment. To enable reception of inputs and provide outputs to the user of the apparatus 200, the I/O module 206 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

The communication module 208 is configured to facilitate communication between the apparatus 200 and one or more remote entities over a communication network, such as a communication network 250. For example, the communication module 208 may enable communication between the apparatus 200 and devices deployed at remote customer support centers including electronic devices associated with human agents and virtual agents for providing service and support based assistance to the visitors on the online enterprise channels. As an illustrative example, the communication module 208 is depicted to facilitate communication with a virtual agent 220 over the communication network 250.

In an embodiment, the communication module 208 may include several channel interfaces to receive information from a plurality of online enterprise channels. In at least some embodiments, the communication module 208 may include relevant Application Programming Interfaces (APIs) to communicate with remote data gathering servers associated with online enterprise channels over the communication network 250 using the APIs. The communication network 250 may be embodied as a wired communication network, for example Ethernet, local area network (LAN), etc., a wireless communication network, for example a cellular network, a wireless LAN, etc., or a combination thereof, for example the Internet. Each channel interface may further be associated with a respective communication circuitry such as for example, a transceiver circuitry including antenna and other communication media interfaces to connect to the communication network 250. The communication circuitry associated with each channel interface may, in at least some example embodiments, enable transmission of data signals and/or reception of signals from remote network entities, such as Web servers hosting enterprise Website or a server at a customer support and service center configured to maintain real-time information related to interactions between customers and enterprises.

In at least one example embodiment, the channel interfaces are configured to receive up-to-date information related to the visitor-enterprise interactions from the online enterprise channels. In some embodiments, the information may also be collated from the plurality of devices utilized by the visitors. To that effect, the communication module 208 may be in operative communication with various visitor touch points, such as electronic devices associated with the visitors, Websites visited by the visitors, devices used by customer support representatives, for example voice agents, chat agents, IVR systems, in-store agents, and the like, engaged by the visitors and the like. As an illustrative example, the communication module 208 is depicted to be communicably associated with a visitor's electronic device 240 over the communication network 250.

The various components of the apparatus 200, such as the processor 202, the memory 204, the I/O module 206 and the communication module 208 are configured to communicate with each other via or through a centralized circuit system 210. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

The apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2A. Moreover, the apparatus 200 may be implemented as a centralized system, or, alternatively, the various components of the apparatus 200 may be deployed in a distributed manner while being operatively coupled to each other. In an embodiment, one or more functionalities of the apparatus 200 may also be embodied as a client within devices, such as visitor's devices. In another embodiment, the apparatus 200 may be a central system that is shared by or accessible to each of such devices.

In at least one example embodiment, the processor 202 is configured to detect presence of a visitor on an online enterprise interaction channel. In an illustrative example, a request for accessing a Web page associated with a Website may be received at a Web server hosting the Website. For instance, a visitor may enter a Uniform Resource Locator (URL) associated with the Web page in a Web browser application to provision a Hypertext Transfer Protocol (HTTP) request to the Web server for Web page access. In response to the HTTP request, the Web server may be configured to provide the Web page to the visitor's device, which may then display the Web page in the UI associated with the Web browser application. The provisioning of the Web page (or Web pages) may be recorded at the Web server. As explained above, the communication module 208 of the apparatus 200 is operatively coupled with Web servers and other data gathering servers. The communication module 208 may receive notification of the visitor's request and subsequent provisioning of the Web page from the Web server and thereby detect presence of the visitor on the Website.

In another illustrative example, an invoking of a native mobile application related with the enterprise may trigger an application programming interface (API) call to the apparatus 200. As explained above, the communication module 208 is in operative communication with personal devices of the visitors. The communication module 208 may receive the API call from the visitor's device. The apparatus 200 may be caused to detect the presence of the visitor on the native mobile application channel in response to the reception of the API call. The apparatus 200 may similarly track presence of visitors in other interaction channels, such as social media channel, and the like.

In at least one example embodiment, the processor 202 is configured to receive information related to the visitor and a current activity of the visitor on an online enterprise channel in substantially real-time. For example, subsequent to detecting the presence of the visitor in an online enterprise channel, information related to the visitor, such as for example, IP address of the visitor, current location coordinates, device type, device operating system (OS), device browser, the type of Internet connection, whether cellular or Wi-Fi, and the like, may be received by the processor 202, for example from the Web server. In at least some embodiments, the IP address may be indicative of a whether the visitor is a first-time visitor or has visited the online enterprise channel previously. More specifically, the processor 202 may be caused to compare the IP address with IP addresses corresponding to enterprise customers stored in the memory 204 for a match. The processor 202 may be caused to identify the visitor as an existing customer, or a visitor, who has previously visited the online enterprise channel, if the IP address matches with a stored IP address in the memory 204. If the visitor is an existing customer or has previously visited the online enterprise channel, the processor 202 may be caused to retrieve historic interaction data associated with the visitor.

In addition to receiving information related to the visitor, in at least some embodiments, the processor 202 is configured to receive information related to the current activity of the visitor on the online enterprise channel. The term 'current activity' as used herein refers to actions performed by the visitor on the online enterprise channel during the current visit to the Website. Examples of actions performed by the visitor may include accessing one or more Web pages, selecting content such as images or hyperlinks displayed on the Web pages, choosing tabs, filling out form fields, initiating purchase transaction, and the like. Accordingly, information related to such actions may be recorded in a Web server or a data logging server associated with the online enterprise channel. The recorded data may be forwarded by the Web server or the data logging server to the communication module 208 in substantially real-time. The communication module 208 may be configured to relay the received data to the processor 202.

In an illustrative example, content pieces such as images, hyperlinks, URLs, and the like, displayed on a Website may be associated with Hypertext Markup Language (HTML) tags or JavaScript tags that are configured to be invoked upon visitor selection of tagged content. The information corresponding to the visitor's activity on the enterprise Website may then be captured by recording an invoking of the tags in a Web server, i.e. a data gathering server, hosting the enterprise Website. In some embodiments, a socket connection may be implemented to capture all information related to the visitor activity on the Website. The captured visitor activity on the Website may include information such as Web pages visited, time spent on each Web page, menu options accessed, drop-down options selected or clicked, mouse movements, HTML links those which are clicked and those which are not clicked, focus events, for example events during which the visitor has focused on a link/Web page for a more than a predetermined amount of time; non-focus events, for example choices the visitor did not make from information presented to the visitor, e.g. products not selected, or non-viewed content derived from scroll history of the visitor; touch events, for example events involving a touch gesture on a touch-sensitive device such as a tablet; non-touch events; and the like. In at least one example embodiment, the communication module 208 may be configured to receive such information from a Web server hosting the Web pages associated with the Website and logging information related to the visitor activity on the Website. In at least one embodiment, the information related to the current activity of the visitor on the online enterprise channel may be received in substantially real-time, i.e. the information related to accessing content on the Web pages, switching between Web pages, and the like may be received as soon as the visitor has performed the activity with minimal delay, for example, delay caused by a time taken for the information to be transmitted over the communication network 250.

In at least one example embodiment, the processor 202 is configured to select an appropriate treatment for the visitor based on the information captured corresponding to the visitor and the visitor's activity on the online enterprise channel. To that effect, in at least one example embodiment, the processor 202 may include a plurality of modules capable of facilitating selection of a treatment for the visitor to the online enterprise channel. The modules of the processor 202 are depicted in FIG. 2B.

Figure 2B:
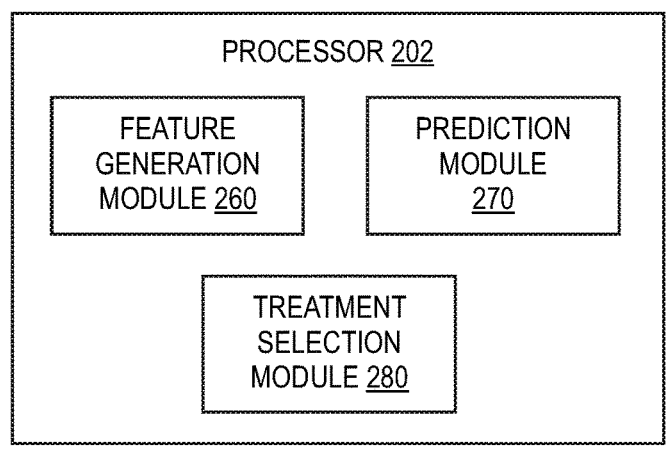
FIG. 2B shows a block diagram of a processor of the apparatus of FIG. 2A in accordance with an embodiment of the invention.

FIG. 2B shows a block diagram of the processor 202 of the apparatus 200 of FIG. 2A, in accordance with an embodiment of the invention. The processor 202 is depicted to include a feature generation module 260, a prediction module 270 and a treatment selection module 280. The various modules of the processor 202 may be implemented using software, hardware, firmware, or a combination thereof. In some example embodiments, the processor 202 may preclude the various modules and is configured to perform all the functions that are collectively performed by the feature generation module 260, the prediction module 270 and the treatment selection module 280. Various modules of the processor 202 are depicted herein for example purposes and that the processor 202 may include fewer or more modules than those depicted in FIG. 2B.

In an embodiment, the feature generation module 260 is configured to receive information related to the visitor and the visitor's current activity on the online enterprise channel. In some embodiments, if the visitor has been successfully identified to be an existing customer or a visitor, who has previously visited the online enterprise channel, then information related to the visitor's past journeys on the online enterprise channel may also be retrieved by the feature generation module 260 from the database in the memory 204 (shown in FIG. 2A). The feature generation module 260 is further configured to transform or convert the received information into a more meaningful or useful form, which is referred to herein as transformed data. In an illustrative example, the transformation of information may include normalization of content included therein. In at least one example embodiment, the normalization of the content is performed to standardize spelling and disambiguate punctuation, etc. For example, the visitor's information such as name, address, phone number, location information, device type information, etc., may be standardized according to preset formats. Similarly, the information related to the current or past activity of the visitor on the online enterprise channel, such as Web URLs for instance, content type, etc.

may be standardized. The normalization of content may also include converting all characters in the text data to lowercase letters, stemming, stop-word removal, spell checking, regular expression replacement, removing all characters and symbols that are not letters in the English alphabet, substituting symbols, abbreviations, and word classes with English words, and replacing two or more space characters, tab delimiters, and newline characters with a single space character, etc. It is noted that normalization of content is explained herein using text categorization models for illustration purposes only, and that various models may be deployed for normalization of content, which include a combination of structured and unstructured data.

In an embodiment, the transformation of the information may also involve clustering of content included therein. At least one clustering algorithm from among K-means algorithm, a Self-Organizing Map (SOM) based algorithm, a Self-Organizing Feature Map (SOFM) based algorithm, a density-based spatial clustering algorithm, an optics clustering based algorithm and the like, may be used for clustering of information related to the visitor and the visitor's activity on the online enterprise channel.

In an embodiment, the feature generation module 260 is further configured to extract a plurality of features from the transformed data. For example, the visitor device type may be extracted from the transformed data as a feature, the visitor's location may be extracted as a feature, the sequence of Web pages visited during the visitor's current visit to the online enterprise channel may be extracted as another feature, and so on and so forth. Further, a feature vector, i.e. a numerical vector comprising a string of binary digits, representative of the feature may be generated for each feature extracted from the transformed data. Accordingly, a plurality of feature vectors may be generated corresponding to a plurality of features.

The plurality of feature vectors are then provided as parameters to the prediction module 270, which is configured to retrieve logic corresponding to at least one classifier associated with intention prediction from the memory 204 to predict whether a treatment from among a plurality of treatments when rendered to the visitor is capable of increasing a likelihood of the visitor performing a desired action, also known as response variable, during a current visit of the visitor to the online enterprise channel. Some examples of providing a treatment to a visitor may include, but are not limited to, providing the visitor with an automated voice assistance, providing the visitor with a text chat related assistance and providing the visitor with a voice call interaction with a human agent. An example of a desired action may include engaging of the visitor in a purchase transaction during the current visit on the online enterprise channel. Another example of the desired action may include clicking on a banner advertisement by the visitor during the current visit on the online enterprise channel.

In at least one example embodiment, the outcome of the processing of the parameters derived from the plurality of feature vectors may be associated with a likelihood measure, also referred to herein as a probability score. For example, an outcome of predicted propensity of the customer to perform a desired action, such as a purchase transaction, may be associated with probability score of '0.85' indicative of an 85% likelihood of the visitor performing the purchase transaction during the current visit to the online enterprise channel.

In at least one example embodiment, the prediction module 270 is configured to generate a first probability score based, at least in part, on the plurality of features. More specifically, as explained above, a feature vector is generated for each feature extracted from the transformed data to configure a plurality of feature vectors. Each feature vector is used as a parameter input to the classifier associated with the prediction module 270. Additionally, a parameter related to a treatment may also be provided as an input to the classifier. In other words, in addition to the parameters derived from the plurality of features, parameter related to treatment to be rendered to the visitor is provided as an input to the classifier, which is configured to generate the first probability score as the output. The first probability score is indicative of a probability of the visitor performing the desired action on the online enterprise channel when rendered respective treatment from among the plurality of treatments.

Further, the prediction module 270 is configured to generate a second probability score based, at least in part, on the plurality of features. More specifically, in addition to the parameters derived from the plurality of features, parameter related to a lack of treatment, i.e. no treatment is rendered to the visitor, is provided as an input to the classifier, which is configured to generate the second probability score as the output. The second probability score is indicative of a probability of the visitor performing the desired action on the online enterprise channel when the visitor is not rendered the treatment. The prediction module 270 may be configured to provide the first probability score and the second probability score for each possible treatment to the treatment selection module 280.

The generation of the probability scores in relation to the visitor performing the desired action with and without treatment is explained with reference to FIGS. 3A and 3B.

Figure 3A:
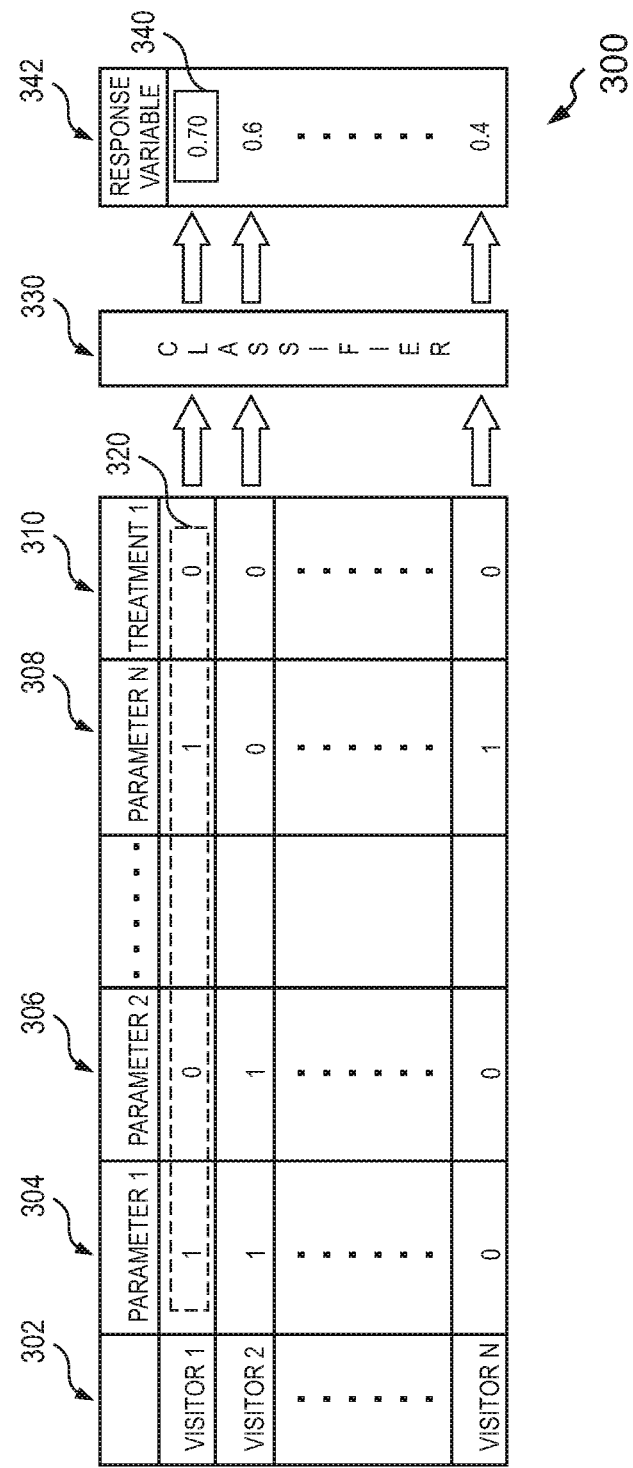
FIG. 3A shows a simplified representation of a table for illustrating generation of a second probability score indicative of a probability of the visitor performing a desired action on an online enterprise channel when the visitor is not rendered the treatment in accordance with an embodiment of the invention.

FIG. 3A shows a simplified representation of a table 300 for illustrating computation of the second probability score indicative of a probability of the visitor performing the desired action on the online enterprise channel when the visitor is not rendered the treatment, in accordance with an embodiment of the invention. The table 300 includes a plurality of columns, such as column 302, 304, 306, 308 and 310. The column 302 includes a list of all visitors, such as visitor 1, visitor 2 and so on and so forth till visitor N, who are currently present on the online enterprise channel. The columns 304, 306 to 308 represent parameters (shown as parameter 1, parameter 2 to parameter N, respectively) configured by features extracted from the information related to the visitors and their respective activities on the online enterprise channels. As explained with reference to FIG. 2A, information such as the visitor device, Operating System, Browser, Location, type of Internet connection, etc., along with information related to the visitor's activity on the online enterprise channel, such as Web pages visited, for example landing page, payment page, etc., time spent on the Web pages, content accessed on the Web pages may be recorded as features and thereafter used to configure feature vectors, which serve as parameters for use in prediction of visitor actions. The entries in the columns record the parameter values for the corresponding parameter for each visitor. Although binary values are shown as entries in the columns 304, 306 to 308, in at least some embodiments, each entry may correspond to a vector (or a numerical value) of fixed length. The column 310 represents a variable 'treatment 1', chosen from one among providing the visitors with an automated voice assistance, a text chat related assistance or a voice call interaction with a human agent. Initially, the entry in the column 310 for the visitor 1 is shown as '0' implying that no treatment is provided to the visitor. The entries in each column from 304 to 310 for each visitor configure a vector 320, i.e. a combination of a plurality of feature vectors, which is provided to a classifier 330, i.e. a machine learning algorithm trained to predict the probability of the visitor performing a desired action, for example clicking on a banner Ad or making a purchase transaction. For example, the vector 320 is provided to the classifier 330 to predict the probability of the visitor 1 performing the desired action without the treatment 1 offered to the visitor 1. As shown, the classifier 330 is depicted to predict a value 340 (shown as 0.70) in a column 342 labeled 'Response Variable, i.e. the variable to be predicted, indicating that there is a very high probability, i.e. 70%, of the visitor performing the desired action without the 'treatment 1' being offered to the visitor 1 during the current journey on the Website. More specifically, the second probability score is predicted to be 0.70, i.e. 70%. The prediction module 270 is similarly configured to predict a probability of the visitor performing the desired action with the 'treatment 1' being offered to the visitor 1 during the current visit to the online enterprise channel. Such a scenario is explained with reference to another table in FIG. 3B.

Figure 3B:
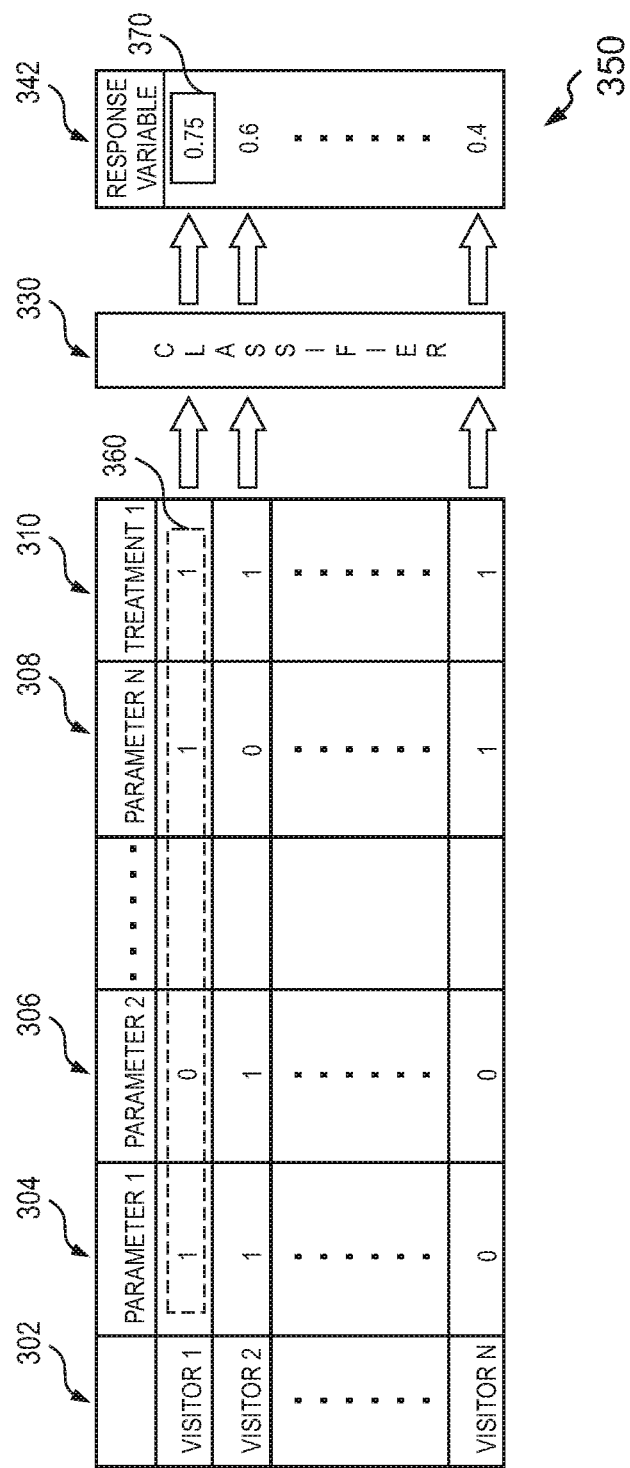
FIG. 3B shows a simplified representation of a table for illustrating generation of a first probability score indicative of a probability of the visitor performing the desired action on the online enterprise channel when rendered treatment in accordance with an embodiment of the invention.

FIG. 3B shows a simplified representation of a table 350 for illustrating computation of the first probability score indicative of a probability of the visitor performing the desired action on the online enterprise channel when rendered treatment, in accordance with an embodiment of the invention. The table 350 is substantially similar to the table 300 shown in FIG. 3A, with only difference being the entry in the column 310 for the visitor 1, which is shown as '1' implying that the treatment 1 is rendered to the visitor. As explained with reference to FIG. 3A, the entries in each column from 304 to 310 for each visitor configure the vector, which is provided to a classifier, i.e. a machine learning algorithm trained to predict the probability of the visitor performing a desired action, for example clicking on a banner ad or making a purchase transaction. For example, a vector 360 is provided to the classifier 330 to predict the probability of visitor 1 performing the desired action with the treatment 1 rendered to the visitor 1. As shown, the classifier 330 is depicted to predict a value 370 (shown as 0.75) in the column 342, indicating that there is a very high probability, i.e. 75%, of the visitor performing the desired action with the 'treatment 1' being offered to the visitor 1 during the current visit to the online enterprise channel. More specifically, the second probability score is predicted to be 0.75, i.e. 75%. It is noted that the values for probability for the visitor performing the desired action when offered treatment is similarly computed for treatments 2, 3 to N. The prediction module 270 (shown in FIG. 2B) is configured to provision the first probability score and the second probability score to the treatment selection module 280.

Referring now to FIG. 2B, in at least one example embodiment, the treatment selection module 280 is configured to compute a difference between the first probability score and the second probability score, for each treatment, and compare the difference with a predefined threshold value. More specifically, the treatment selection module 280 is configured to compute a difference (also interchangeably referred to herein as the differential score) between the probabilities of the visitor performing a desired action without treatment and with treatment for each treatment. As an illustrative example, a Differential Score (DS) for the treatment 1 may be computed as shown in Equation (1):

$$DS = P(\text{Action with treatment1}) - P(\text{Action without treatment1}) \quad \text{Equation (1)}$$

The treatment selection module 280 is further configured to compare the difference for each treatment with a predefined threshold value. For example, from the tables 300 and 350 shown in FIGS. 3A and 3B, respectively, the differential score for the treatment 1 for visitor 1 is computed as shown below:

$$DS = 0.75 - 0.7 = 0.05 (i.e.\ 5\%)$$

In at least one example embodiment, the treatment selection module 280 is configured to identify a treatment to be capable of increasing the likelihood of the visitor performing the desired action on the online enterprise channel if the difference is greater than the predefined threshold value, such as 0.5 or 50%, for instance. A treatment is considered to be incapable of increasing the likelihood of the visitor performing the desired action on the online enterprise channel if the difference is less than or equal to the predefined threshold value. In case of the treatment 1, the differential score of 0.05, i.e. 5%, is less than the predefined threshold value of 0.5, i.e. 50%. Accordingly, the treatment selection module 280 is configured to consider the treatment 1 to be be incapable of increasing the likelihood of the visitor performing the desired action on the online enterprise channel.

The treatment selection module 280 is configured to compare the difference of the first probability score and the second probability score with predefined threshold value for each treatment. In some embodiments, if only one treatment is determined to be capable of increasing the likelihood of the visitor performing the desired action during the current visit, then the treatment selection module 280 is configured to select the treatment and cause rendering of the selected treatment to the visitor during the current visit of the visitor to the online enterprise channel. Alternatively, the treatment selection module 280 is configured to select no treatment for the visitor during the current visit if it is determined that no treatment from among the plurality of treatments is capable of increasing the likelihood of the visitor performing the desired action.

In some embodiments, one or more treatments may be identified to be capable of increasing the likelihood of the visitor performing the desired action on the online enterprise channel. In such a scenario, the treatment from among the one or more treatments associated with the highest difference over corresponding predefined threshold value is selected as the treatment to be rendered to the visitor during the current visit to the online enterprise channel. For example, one treatment may relate to rendering automated voice assistance, i.e. IVR based assistance, to the visitor. For such a treatment, the differential score may be 0.6 and it may be greater than the predefined threshold value of 0.5. Further, another treatment may relate to rendering text chat related assistance. The differential score may be 0.55 and it may be greater than the predefined threshold value of 0.5. Furthermore, yet another treatment may relate to rendering voice call interaction with a human agent to the visitor. For such as treatment, the differential score may be 0.8 and it may be greater than the predefined threshold value of 0.5. As all three treatments are associated with a differential score which is greater than the predefined threshold value, the treatment associated with the highest differential score, i.e. treatment offering voice call interaction to the human agent, may be selected and rendered to the visitor.

If no treatment is associated with a differential score greater than the predefined threshold value, then no treatment is provided to the visitor, or in other words, intervention is precluded during the current visit of the visitor to the online enterprise channel.

In at least some example embodiments, a treatment offered to the visitor may include display of banner advertisements (also referred to herein as banner ads) during the current visit of the visitor on the online enterprise channel. The determination of whether a particular banner ad is to be displayed or not may be performed as explained above. More specifically, the feature generation module 260 is configured to extract features from the content associated with the banner ad and provide the cumulative set of features, i.e. visitor related features and banner related features, to the prediction module 270. The prediction module 270 is configured to predict the probability scores of the visitor performing the desired action, i.e. making a purchase transaction, without the display of the banner ad and with display of the banner ad. The probability scores may be provided to the treatment selection module 280, which may be configured to compute a difference in the probability scores and compare the difference score with a predefined threshold value and determine if the banner ad is to be displayed to the visitor during the current journey or not.

Such selection of treatment for online visitors offers several advantages. Consider a scenario, where an online visitor would have performed a desired action whether or not treatment is provided to the visitor. In such a scenario, the probability of the visitor performing the desired action without the treatment would be high, e.g. greater than 75%, as the visitor intends to make a purchase transaction. Moreover, the probability of the visitor performing the desired action with the treatment would also be high, again, greater than 75%. The difference between the two high probability scores would be low and when compared with a predefined threshold value, it may be determined that the difference is lower than the predefined threshold value. In such a scenario, no treatment is offered to the visitor as the treatment does not increase the likelihood of the visitor performing the purchase transaction, or in other words, the treatment would have had no effect, and the visitor would still perform the desired action. As a result of precluding unnecessary intervention, the visitor experience on the online enterprise channel is not degraded.

Consider another scenario, where a visitor would not have performed a desired action whether or not treatment is provided to the visitor. In such a scenario, the probability of the visitor performing the desired action without the treatment would be low, e.g. lower than 25%. Moreover, the probability of the visitor performing the desired action with the treatment would also be low, again, lower than 25%. The difference between the two low probability scores would be low and when compared with a predefined threshold value, it may be determined that the difference is lower than the predefined threshold value. In such a scenario, no treatment is offered to the visitor as the treatment would have had no effect, and the visitor would still not perform the desired action. As a result of precluding unnecessary intervention, the visitor experience on the online enterprise channel is not degraded.

As the treatment is only provided to those visitors for whom the treatment would elicit the desired response which otherwise would have not occurred, such a treatment selection approach enables an increase in the conversion score while precluding unpleasant experience for those visitors who may get annoyed with offers of treatment during their respective journeys on the online enterprise channels.

Referring now to FIG. 2B, for cases involving introduction of new content, such as a new banner advertisement, the prediction of the probability of the visitor performing the desired action with treatment may be difficult as sufficient learnt behavior for the new content may not be available for predicting with substantial accuracy the probability of the visitor performing the desired action. In such a scenario, the feature generation module 260 (shown in FIG. 2B) may be configured to extract features from the new content. The extraction of features from the new content is explained with reference to FIG. 4A.

Figure 4A:
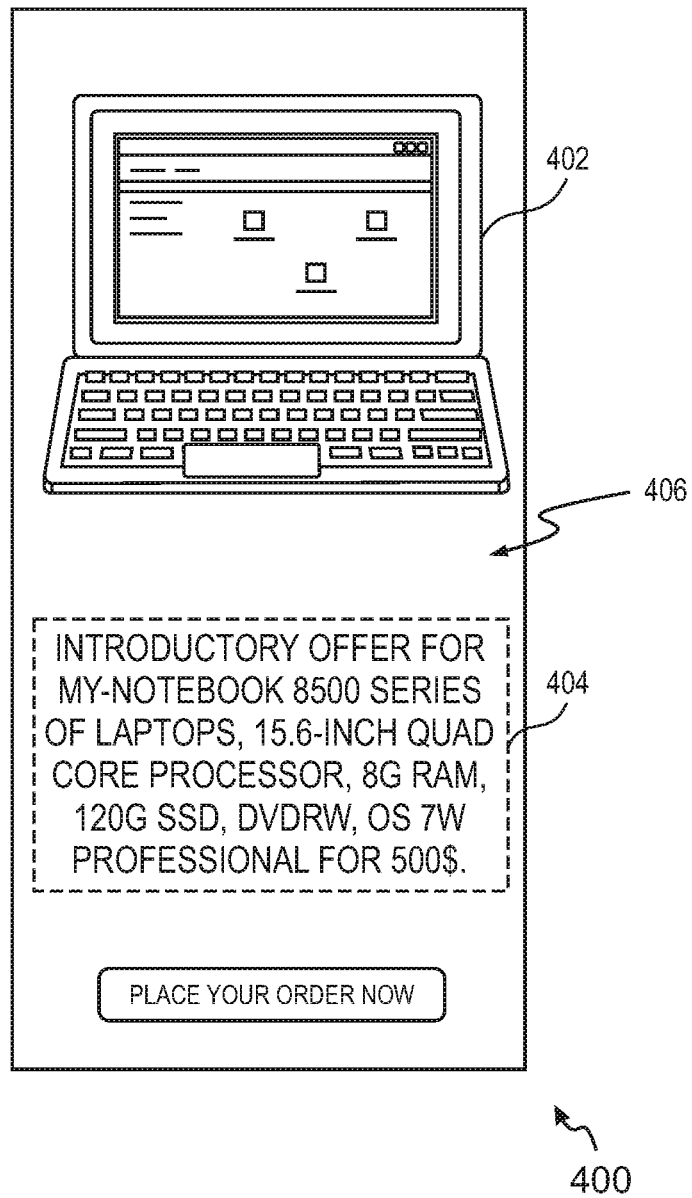
FIG. 4A shows an example banner advertisement in accordance with an embodiment of the invention.

FIG. 4A shows an example banner advertisement 400 in accordance with an embodiment of the invention. The banner advertisement 400 is exemplarily depicted to an advertisement for a new laptop offering of an enterprise. In at least one example embodiment, the banner advertisement 400 may correspond to a new advertisement that has not been previously displayed to visitors on the online enterprise channels, or more specifically, the banner advertisement is being displayed on the online enterprise channels for a first time.

The banner advertisement 400 includes an image 402 of the laptop, text content 404 and white space regions, such as a white space 406. In at least one example embodiment, for determining whether the banner advertisement 400 should be displayed to an online visitor during the visitor's current visit to an enterprise Website, the banner advertisement 400 may be fetched from a database in the memory 204 (shown in FIG. 2A) and provided to the processor 202. Further, the feature generation module 260 (shown in FIG. 2B) of the processor 202 may be configured to extract features in terms of the banner advertisement 400. The extracted features may include image related features, e.g. size, color, contrast, etc., text related features, e.g. font size, text color, etc., overall banner related features, e.g. banner shape, banner dimensions, white space proportion, button content, etc. In some embodiments, a convolutional neural network (CNN) based auto-encoder may be trained to extract features and generate feature vectors, which are then provided as parameters to the classifier as shown in FIG. 4B.

Figure 4B:
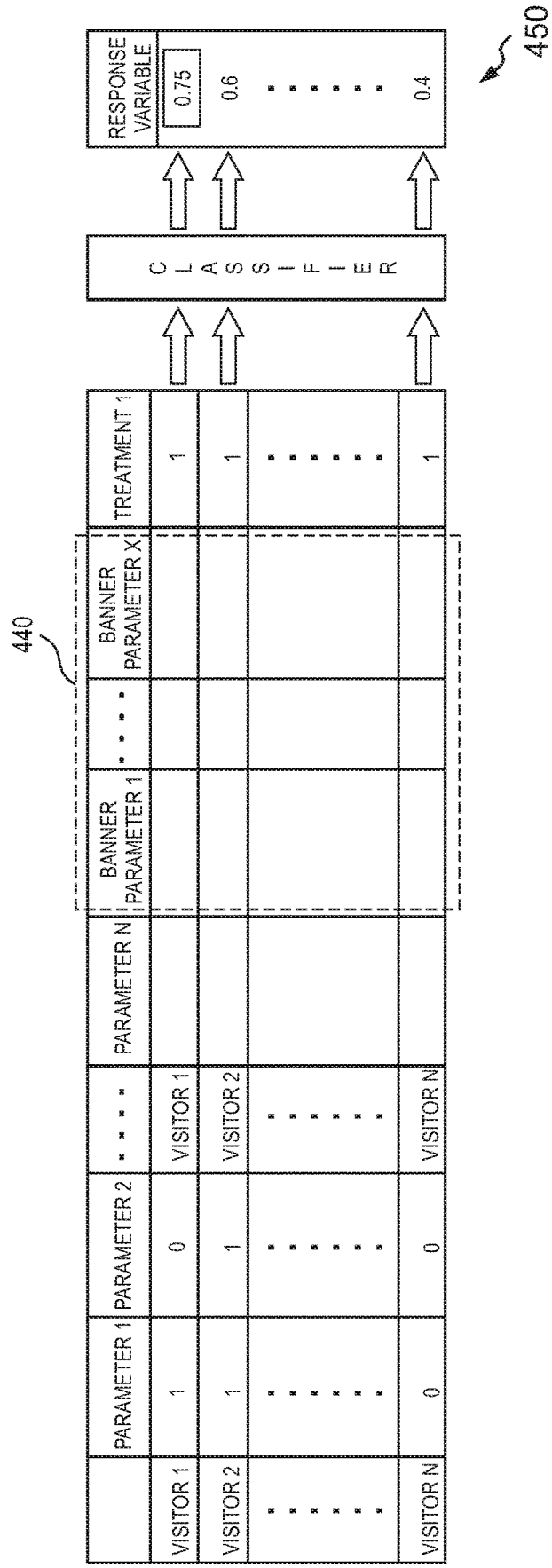
FIG. 4B shows a simplified representation of a table for illustrating addition of parameters related to the banner advertisement of FIG. 4A for computing a probability of a visitor performing a desired action subsequent to display of the banner advertisement in accordance with an embodiment of the invention.

Referring now to FIG. 4B, a simplified representation of a table 450 for illustrating addition of parameters related to the banner advertisement 400 of FIG. 4A for computing the probability of a visitor performing a desired action subsequent to display of the banner advertisement 400 of FIG. 4A is shown, in accordance with an embodiment of the invention. More specifically, the table 450 shows addition of section 440 including columns showing additional parameters (shown as banner parameter 1 to banner parameter X) related to the extracted features from the banner advertisement 400 shown in FIG. 4A. The extracted features from the banner advertisement 400, when added to the plurality of features extracted from the transformed data, configure a set of features. The set of features may then be used to determine the selection of the treatment. More specifically, the set of features are used to generate the plurality of feature vectors which are used as parametric input to the prediction module 270.

The prediction module 270 (shown in FIG. 2B) is configured to generate a first probability score indicative of a probability of the visitor performing the desired action, for example engage in a purchase transaction, when the banner advertisement is displayed to the visitor during the current visit on the online enterprise channel. The prediction module 270 (shown in FIG. 2B) is also configured to generate a second probability score indicative of a probability of the visitor performing the desired action when the banner advertisement is not displayed to the visitor during the current visit on the online enterprise channel.

The two probability scores are provided to the treatment selection module 280 (shown in FIG. 2B), which is configured to compare a difference between the first probability score and the second probability score with a predefined threshold value derived at least in part based on a default banner advertisement. More specifically, the difference is compared with the differential score for a default banner, i.e. the differential score for the default banner may serve as the predefined threshold value. In an embodiment, the treatment selection module 280 is configured to determine that displaying the banner advertisement 400 is capable of increasing the likelihood of the visitor performing the desired action on the online enterprise channel if the difference is greater than the predefined threshold value. The treatment selection module 280 is then configured to cause display of the banner advertisement 400 to the visitor during the visitor's current visit to the enterprise Website. On the other hand, the treatment selection module 280 is configured to determine that the displaying of the banner advertisement 400 is incapable of increasing the likelihood of the visitor performing the desired action on the online enterprise channel if the difference is less than or equal to the predefined threshold value. In such a scenario, the banner advertisement 400 is not displayed to the visitor during the current visit on the online enterprise channel.

A method for facilitating turn-based interactions between virtual agents and customers of the enterprise is explained next with reference to FIG. 5.

Figure 5:
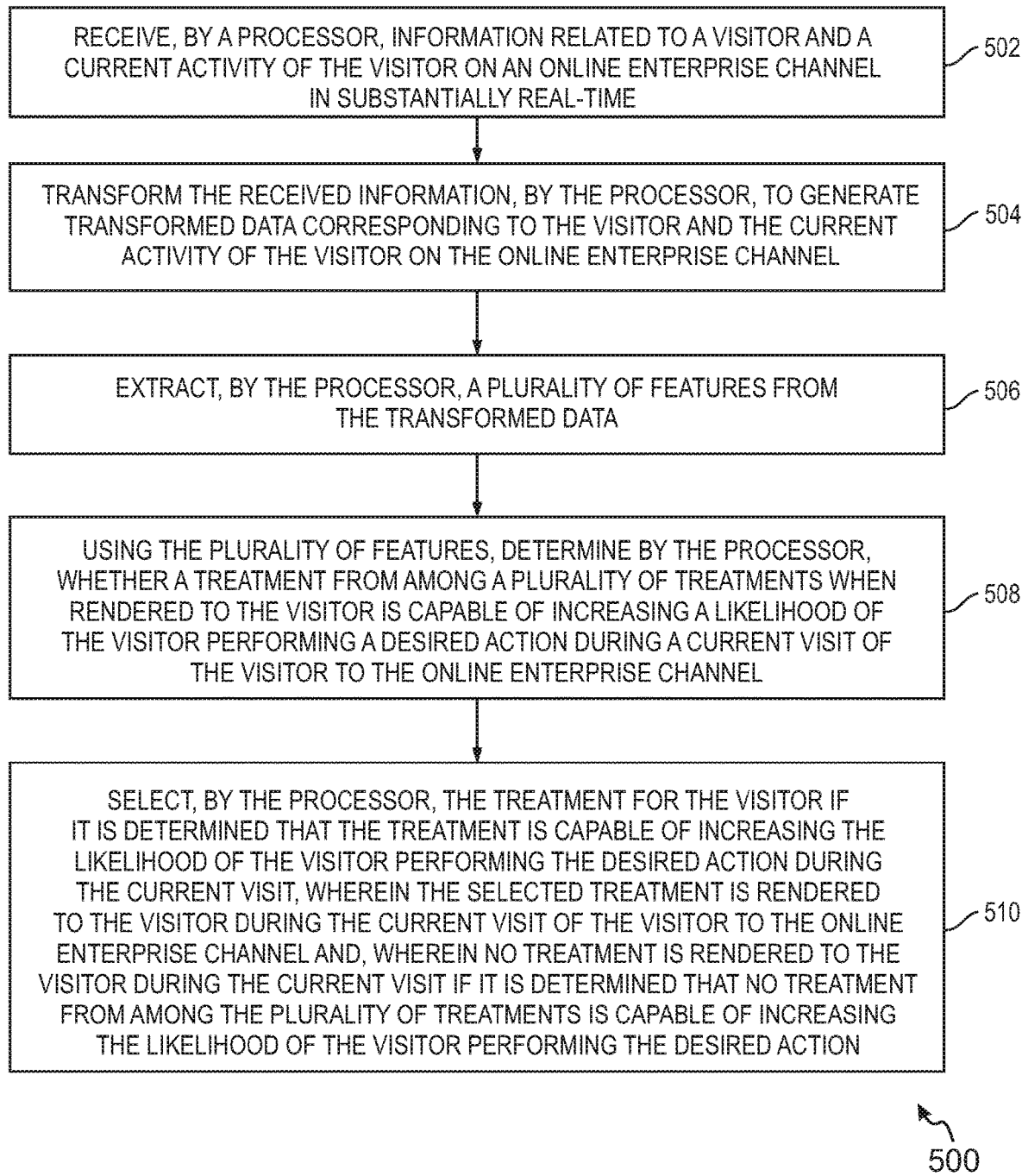
FIG. 5 shows a flow diagram of a method for selecting treatment for a visitor to an online enterprise channel in accordance with an embodiment of the invention.

FIG. 5 shows a flow diagram of a method 500 for selecting a treatment for a visitor to an online enterprise channel, in accordance with an embodiment of the invention. The method 500 depicted in the flow diagram may be executed by, for example, the apparatus 200 explained with reference to FIG. 2A to 4B. Operations of the flowchart, and combinations of operation in the flowchart, may be implemented by, for example, hardware, firmware, a processor, circuitry and/or a different device associated with the execution of software that includes one or more computer program instructions. The operations of the method 500 are described herein with help of the apparatus 200. It is noted that, the operations of the method 500 can be described and/or practiced by using any system other than the apparatus 200. The method 500 starts at operation 502.

At operation 502 of the method 500, information related to a visitor and a current activity of the visitor on an online enterprise channel is received in substantially real-time by a processor, such as the processor 202 of the apparatus 200. As explained with reference to FIG. 2A, the processor is configured to detect presence of a visitor on an online enterprise interaction channel. The detection of the presence of the visitor on the online enterprise interaction channel may be performed as explained with reference to FIG. 2A and is not explained again herein. Subsequent to detecting the presence of the visitor in an online enterprise channel, information related to the visitor, such as for example, IP address of the visitor, current location co-ordinates, device type, device Operating System (OS), device browser, the type of Internet connection, whether cellular or Wi-Fi, and the like, may be received by the processor, for example from the Web server. In at least some embodiments, the IP address may be indicative of a whether the visitor is a first-time visitor or has visited the online enterprise channel previously. More specifically, the processor may be caused to compare the IP address with IP addresses corresponding to enterprise customers stored in the memory 204 for a match.

The processor may be caused to identify the visitor as an existing customer, or a visitor, who has previously visited the online enterprise channel, if the IP address matches with a stored IP address in the memory. If the visitor is an existing customer or has previously visited the online enterprise channel, the processor may be caused to retrieve historic interaction data associated with the visitor.

In addition to receiving information related to the visitor, in at least some embodiments, the processor may be configured to receive information related to the current activity of the visitor on the online enterprise channel. The term 'current activity' as used herein refers to actions performed by the visitor on the online enterprise channel during the current visit to the Website. Examples of actions performed by the visitor may include accessing one or more Web pages, selecting content such as images or hyperlinks displayed on the Web pages, choosing tabs, filling out form fields, initiating purchase transaction, and the like. Accordingly, information related to such actions may be recorded in a Web server or a data logging server associated with the online enterprise channel. The recorded data may be communicated by the Web server or the data logging server to the processor in substantially real-time.

In an illustrative example, content pieces such as images, hyperlinks, URLs, and the like, displayed on a Website may be associated with Hypertext Markup Language (HTML) tags or JavaScript tags that are configured to be invoked upon visitor selection of tagged content. The information corresponding to the visitor's activity on the online enterprise channel may then be captured by recording an invoking of the tags in a Web server, i.e. a data gathering server, hosting the online enterprise channel. In some embodiments, a socket connection may be implemented to capture all information related to the visitor activity on the online enterprise channel. The captured visitor activity on the online enterprise channel may include information such as Web pages visited, time spent on each Web page, menu options accessed, drop-down options selected or clicked, mouse movements, HTML links those which are clicked and those which are not clicked, focus events, for example events during which the visitor has focused on a link/Web page for a more than a predetermined amount of time, non-focus events, for example choices the visitor did not make from information presented to the visitor, e.g. products not selected, or non-viewed content derived from scroll history of the visitor, touch events, for example events involving a touch gesture on a touch-sensitive device such as a tablet, non-touch events, and the like. In at least one example embodiment, the processor may be configured to receive such information from a Web server hosting the Web pages associated with the online enterprise channel and logging information related to the visitor activity on the online enterprise channel. In at least one embodiment, the information related to the current activity of the visitor on the online enterprise channel may be received in substantially real-time, i.e. the information related to accessing content on the Web pages, switching between Web pages, and the like may be received as soon as the visitor has performed the activity with minimal delay, for example, delay caused by a time taken for the information to be transmitted over a communication network, such as the Internet.

At operation 504 of the method 500, the received information is transformed by the processor to generate transformed data corresponding to the visitor and the current activity of the visitor on the online enterprise channel. In an illustrative example, the transformation of information may include normalization of content included therein. In at least one example embodiment, the normalization of the content is performed to standardize spelling and disambiguate punctuation, etc. For example, the visitor's information such as name, address, phone number, location information, device type information, etc., may be standardized according to preset formats. Similarly, the information related to the current or past activity of the visitor on the online enterprise channel, such as Web URLs for instance, content type, etc. may be standardized. The normalization of content may also include converting all characters in the text data to lowercase letters, stemming, stop-word removal, spell checking, regular expression replacement, removing all characters and symbols that are not letters in the English alphabet, substituting symbols, abbreviations, and word classes with English words, and replacing two or more space characters, tab delimiters, and newline characters with a single space character etc. Normalization of content is explained herein using text categorization models for illustration purposes only, and that various models may be deployed for normalization of content, which include a combination of structured and unstructured data.

In an embodiment, the transformation of the information may also involve clustering of content included therein. At least one clustering algorithm from among K-means algorithm, a Self-Organizing Map (SOM) based algorithm, a Self-Organizing Feature Map (SOFM) based algorithm, a density-based spatial clustering algorithm, an optics clustering based algorithm, and the like, may be used for clustering of information related to the visitor and the visitor's activity on the online enterprise channel.

At operation 506 of the method 500, a plurality of features is extracted from the transformed data by the processor. For example, the visitor device type may be extracted from the transformed data as a feature, the visitor's location may be extracted as a feature, the sequence of Web pages visited during the visitor's current visit to the online enterprise channel may be extracted as another feature and, so on and so forth. Further, a feature vector, i.e. a numerical vector comprising a string of binary digits, representative of the feature may be generated for each feature extracted from the transformed data. Accordingly, a plurality of feature vectors may be generated corresponding to a plurality of features.

At operation 508 of the method 500, it is determined by the processor using the plurality of features whether a treatment from among a plurality of treatments when rendered to the visitor is capable of increasing a likelihood of the visitor performing a desired action during a current visit of the visitor to the online enterprise channel. As explained with reference to operation 506, the plurality of feature vectors are generated from the plurality of features. Each feature vector is used as a parameter input to the classifier associated with the processor. Additionally, a parameter related to a treatment may also be provided as an input to the classifier. The classifier is configured to predict whether a treatment from among a plurality of treatments when rendered to the visitor is capable of increasing a likelihood of the visitor performing a desired action during a current visit of the visitor to the online enterprise channel. An example of a desired action may include the visitor engaging in a purchase transaction on the online enterprise channel. Another example of the desired action may include the visitor clicking on a banner advertisement. Some examples of providing a treatment to a visitor corresponds to one of providing the visitor with an automated voice assistance, providing the visitor with a text chat related assistance and providing the visitor with voice call interaction with a human agent. In at least one example embodiment, the outcome of the processing of the parameters derived from the plurality of feature vectors may be associated with a likelihood measure, also referred to herein as a probability score. For example, an outcome of predicted propensity of the customer to perform a desired action, such as a purchase transaction, may be associated with probability score of '0.85' indicative of an 85% likelihood of the visitor performing the purchase transaction during the current visit to the online enterprise channel.

At operation 510 of the method 500, the treatment is selected for the visitor if it is determined that the treatment is capable of increasing the likelihood of the visitor performing the desired action during the current visit. The selected treatment is rendered to the visitor during the current visit of the visitor to the online enterprise channel. Further, no treatment is rendered to the visitor during the current visit if it is determined that no treatment from among the plurality of treatments is capable of increasing the likelihood of the visitor performing the desired action.

In at least one example embodiment, the processor is configured to identify a treatment to be capable of increasing the likelihood of the visitor performing the desired action on the online enterprise channel if the difference between the probability scores with treatment and without treatment is greater than the predefined threshold value, such as 0.5 or 50%, for instance. The treatment is considered to be incapable of increasing the likelihood of the visitor performing the desired action on the online enterprise channel if the difference is less than or equal to the predefined threshold value.

In at least some embodiments, the processor is configured to compare the difference of the first probability score and the second probability score with predefined threshold value for each treatment. In some embodiments, if only one treatment is determined to be capable of increasing the likelihood of the visitor performing the desired action during the current visit, then the processor is configured to select the treatment and cause rendering of the selected treatment to the visitor during the current visit of the visitor to the online enterprise channel. Further, the processor is configured to select no treatment for the visitor during the current visit if it is determined that no treatment from among the plurality of treatments is capable of increasing the likelihood of the visitor performing the desired action.

In some embodiments, one or more treatments may be identified to be capable of increasing the likelihood of the visitor performing the desired action on the online enterprise channel. In such a scenario, the treatment from among the one or more treatments associated with the highest difference over corresponding predefined threshold value is selected as the treatment to be rendered to the visitor during the current visit to the online enterprise channel. The method 500 ends at operation 510.

Another method for selecting a treatment for a visitor to an online enterprise channel is explained next with reference to FIG. 6.

Figure 6:
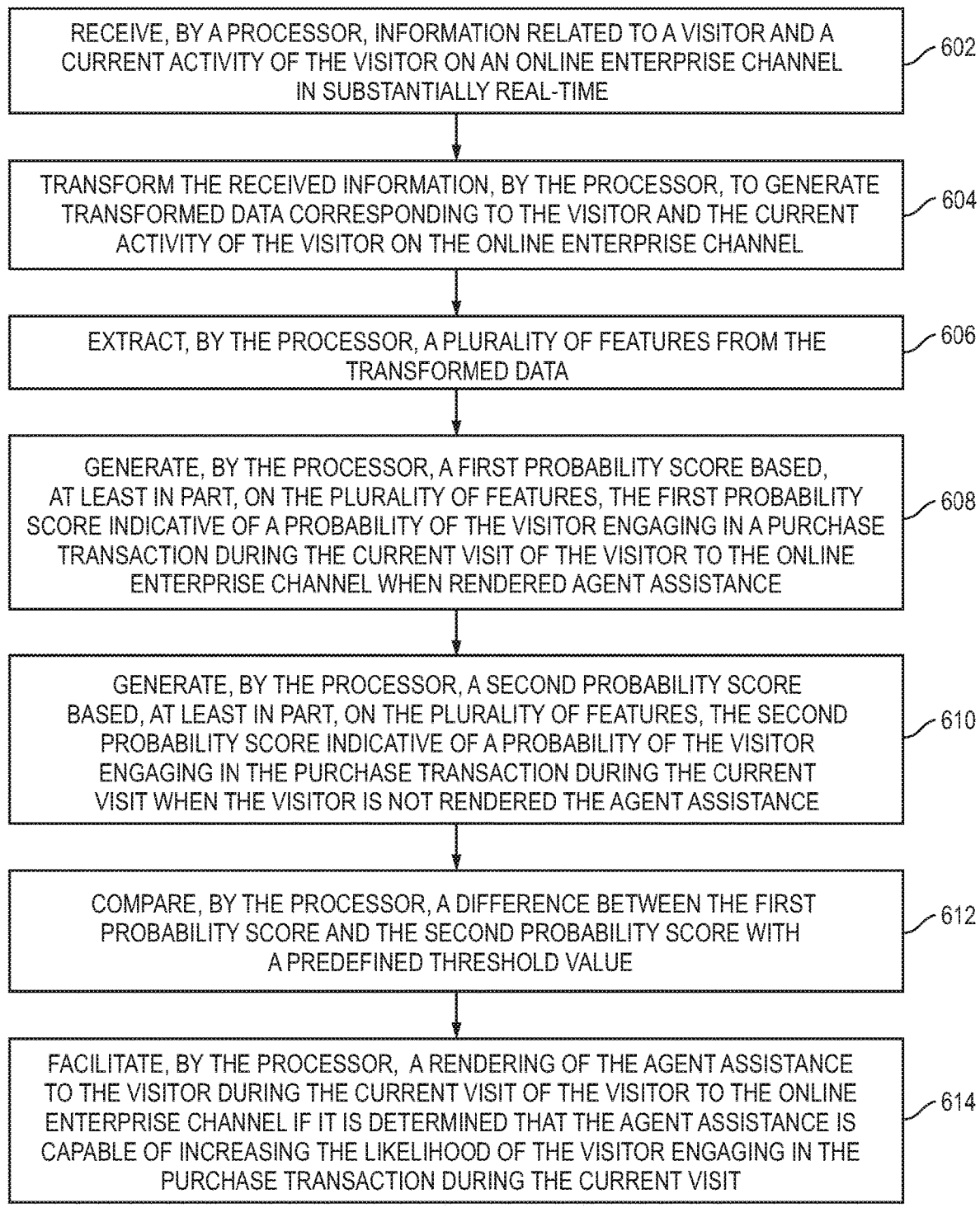
FIG. 6 shows a flow diagram of a method for selecting treatment for a visitor to an online enterprise channel in accordance with another embodiment of the invention.

FIG. 6 shows a flow diagram of a method 600 for selecting a treatment for a visitor to an online enterprise channel in accordance with another embodiment of the invention. The method 600 depicted in the flow diagram may be executed by, for example, the apparatus 200 explained with reference to FIGS. 2A to 4B. Operations of the flowchart, and combinations of operation in the flowchart, may be implemented by, for example, hardware, firmware, a processor, circuitry, and/or a different device associated with the execution of software that includes one or more computer program instructions. The method 600 starts at operation 602.

At operation 602 of the method 600, information related to a visitor and a current activity of the visitor on an online enterprise channel is received by a processor, such as the processor 202 of the apparatus 200, in substantially real-time. At operation 604 of the method 600, the received information is transformed by the processor to generate transformed data corresponding to the visitor and the current activity of the visitor on the online enterprise channel. At operation 606 of the method 600, a plurality of features is extracted from the transformed data. The operations 602, 604 and 606 are similar to the operations 502, 504 and 506, respectively and are not explained again herein.

At operation 608 of the method 600, a first probability score is generated based, at least in part, on the plurality of features by the processor. As explained with reference to operation 508 of the method 500, a feature vector is generated for each feature extracted from the transformed data to configure a plurality of feature vectors. Each feature vector is used as a parameter input to the classifier associated with the processor. Additionally, a parameter related to agent assistance, for example parameter corresponding to a treatment type such as automated voice assistance, text based assistance or assistance in form of a voice call interaction with a human agent, may also be provided as an input to the classifier. In other words, in addition to the parameters derived from the plurality of features, parameter related to agent assistance to be rendered to the visitor is provided as an input to the classifier, which is configured to generate the first probability score as the output. The first probability score is indicative of a probability of the visitor performing the desired action on the online enterprise channel when rendered agent assistance.

At operation 610 of the method 600, a second probability score is generated based, at least in part, on the plurality of features by the processor. More specifically, in addition to the parameters derived from the plurality of features, parameter related to a lack of agent assistance, i.e. no agent assistance is rendered to the visitor, is provided as an input to the classifier, which is configured to generate the second probability score as the output. The second probability score is indicative of a probability of the visitor performing the desired action on the online enterprise channel when the visitor is not rendered agent assistance.

At operation 612 of the method 600, a difference between the first probability score and the second probability score is compared with a predefined threshold value by the processor. At operation 614 of the method 600, a rendering of the agent assistance to the visitor is facilitated by the processor during the current visit of the visitor to the online enterprise channel if it is determined that the agent assistance is capable of increasing the likelihood of the visitor engaging in the purchase transaction during the current visit. More specifically, if the difference is greater than the predefined threshold value, the processor is configured to determine that the agent assistance when rendered to the visitor is capable of increasing the likelihood of the visitor performing the desired action on the online enterprise channel. In such a case, the processor is configured to cause display of a widget offering agent assistance to the visitor during the current visit of the visitor to the online enterprise channel. The visitor selection of the widget may initiate the agent interaction, for example a chat interaction or the voice interaction with a human/virtual agent to facilitate rendering of the agent assistance to the visitor. The agent assistance is not rendered to the visitor during the current visit if it is determined that the agent assistance is incapable of increasing the likelihood of the visitor performing the desired action. The method 600 ends at operation 612.

Various embodiments disclosed herein provide numerous advantages. The techniques disclosed herein suggest techniques for selecting the appropriate treatment for each online visitor to provide an enriched experience of visiting online enterprise channels. As explained with reference to FIG. 2A to 6, a treatment for an online visitor is selected only if the treatment can elicit the desired action from the online visitor. No treatment is selected for the online visitor if it is determined that the desired action cannot be elicited from the online visitor by provisioning of treatments. Such selection of treatment precludes targeting visitors for whom the treatment may not yield any benefit and as such may even annoy the visitors. As a result, the visitors are precluded from having a poor online experience, which may lead to a loss of revenue for the enterprise.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an apparatus, as described and depicted in FIGS. 2A and 2B. A computer-readable medium may include a computer-readable storage medium that may be any media or means that can contain or store the instructions for use by or in connection with an instruction execution system, system, or device, such as a computer.

Although the invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry, for example complementary metal oxide semiconductor (CMOS) based logic circuitry, firmware, software and/or any combination of hardware, firmware, and/or software, for example embodied in a machine-readable medium. For example, the apparatuses and methods may be embodied using transistors, logic gates, and electrical circuits, for example application specific integrated circuit (ASIC) circuitry and/or in Digital Signal Processor (DSP) circuitry.

Particularly, the apparatus 200 and its various components such as the processor 202, the memory 204, the I/O module 206, the communication module 208, and the centralized circuit system 210 may be enabled using software and/or using transistors, logic gates, and electrical circuits, for example integrated circuit circuitry such as ASIC circuitry. Various embodiments of the invention may include one or more computer programs stored or otherwise embodied on a computer-readable medium, wherein the computer programs are configured to cause a processor or computer to perform one or more operations, for example operations explained herein with reference to FIG. 5 or 6. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media such as floppy disks, magnetic tapes, hard disk drives, etc., optical magnetic storage media, e.g, magneto-optical disks, CD-ROM (compact disc read only memory), CD-R (compact disc recordable), CD-R/W (compact disc rewritable), DVD (Digital Versatile Disc), BD (Blu-ray (registered trademark) Disc), and semiconductor memories such as mask ROM, PROM (programmable ROM), EPROM (erasable PROM), flash ROM, RAM (random access memory), etc. Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line, e.g., electric wires, and optical fibers, or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the Claims.

The invention claimed is:

1. A computer-implemented method, comprising:
receiving, by a processor, information related to a visitor and a current activity of the visitor on an online enterprise channel in substantially real-time;
transforming the received information, by the processor, to generate transformed data corresponding to the visitor and the current activity of the visitor on the online enterprise channel;
extracting, by the processor, a plurality of features from the transformed data;
using the plurality of features, determining by the processor, whether a treatment from among a plurality of treatments when rendered to the visitor is capable of increasing a likelihood of the visitor performing a desired action during a current visit of the visitor to the online enterprise channel;
selecting, by the processor, the treatment for the visitor when it is determined that the treatment is capable of increasing the likelihood of the visitor performing the desired action during the current visit;
rendering the selected treatment to the visitor during the current visit of the visitor to the online enterprise channel;
rendering no treatment to the visitor during the current visit when it is determined that no treatment from among the plurality of treatments is capable of increasing the likelihood of the visitor performing the desired action when;
wherein the treatment corresponds to displaying a banner advertisement to the visitor during the current visit of the visitor to the online enterprise channel, wherein the banner advertisement is to be displayed on the online enterprise channel for a first time;
extracting, by the processor, one or more features from the banner advertisement; adding the one or more features to the plurality of features extracted from the transformed data to configure a set of features;
generating, by the processor, a first probability score based, at least in part, on the set of features, the first probability score indicative of a probability of the visitor performing the desired action when the banner advertisement is displayed to the visitor during the current visit on the online enterprise channel;
generating, by the processor, a second probability score based, at least in part, on the set of features, the second probability score indicative of a probability of the visitor performing the desired action when the banner advertisement is not displayed to the visitor during the current visit on the online enterprise channel;
comparing, by the processor, a difference between the first probability score and the second probability score with a predefined threshold value derived at least in part based on a default banner advertisement;
determining that displaying the banner advertisement is capable of increasing the likelihood of the visitor performing the desired action on the online enterprise channel when the difference is greater than the predefined threshold value; and determining that displaying the banner advertisement is incapable of increasing the likelihood of the visitor performing the desired action on the online enterprise channel when the difference is less than or equal to the predefined threshold value.

2. The method of claim 1, further comprising performing for each treatment from among the plurality of treatments:
generating, by the processor, a first probability score based, at least in part, on the plurality of features, the first probability score indicative of a probability of the visitor performing the desired action on the online enterprise channel when rendered respective treatment from among the plurality of treatments;
generating, by the processor, a second probability score based, at least in part, on the plurality of features, the second probability score indicative of a probability of the visitor performing the desired action on the online enterprise channel when the visitor is not rendered the respective treatment; and
comparing, by the processor, a difference between the first probability score and the second probability score with a predefined threshold value.

3. The method of claim 2, further comprising:
identifying the respective treatment to be capable of increasing the likelihood of the visitor performing the desired action on the online enterprise channel when the difference is greater than the predefined threshold value; and determining the respective treatment to be incapable of increasing the likelihood of the visitor performing the desired action on the online enterprise channel when the difference is less than or equal to the predefined threshold value.

4. The method of claim 3, further comprising:
selecting the treatment to be rendered to the visitor from among one or more treatments from among the plurality of treatments, the one or more treatments identified to be capable of increasing the likelihood of the visitor performing the desired action on the online enterprise channel.

5. The method of claim 4, further comprising:
selecting the treatment from among the one or more treatments associated with the highest difference over corresponding predefined threshold value as the treatment to be rendered to the visitor during the current visit to the online enterprise channel.

6. The method of claim 1, wherein the desired action corresponds to one of the visitor engaging in a purchase transaction on the online enterprise channel and the visitor clicking on a banner advertisement.

7. The method of claim 1, wherein the treatment from among the plurality of treatments corresponds to one of providing the visitor with an automated voice assistance, providing the visitor with a text chat related assistance and providing the visitor with a voice call interaction with a human agent.

8. The method of claim 1, wherein the information comprises at least one of visitor device information, visitor device Operating System and Web browser information, visitor location information, visitor Internet connection type information, information related to Web pages visited during the current visit, information related to time spent on each visited Web page and information related to content accessed on each visited Web page.

9. The method of claim 1, further comprising:
generating, by the processor, a first probability score based, at least in part, on the plurality of features, the first probability score indicative of a probability of the visitor engaging in a purchase transaction during a current visit of the visitor to the online enterprise channel when rendered agent assistance;
generating, by the processor, a second probability score based, at least in part, on the plurality of features, the second probability score indicative of a probability of the visitor engaging in the purchase transaction during the current visit when the visitor is not rendered the agent assistance;
comparing, by the processor, a difference between the first probability score and the second probability score with a predefined threshold value;
facilitating, by the processor, a rendering of the agent assistance to the visitor during the current visit of the visitor to the online enterprise channel when it is determined that the agent assistance is capable of increasing the likelihood of the visitor engaging in the purchase transaction during the current visit; and
not rendering the agent assistance to the visitor during the current visit when it is determined that the agent assistance is incapable of increasing the likelihood of the visitor engaging in the purchase transaction.

10. The method of claim 9, wherein the agent assistance corresponds to one of an automated voice assistance, a text chat related assistance and a voice call interaction with a human agent.

11. The method of claim 9, wherein the information comprises at least one of visitor device information, visitor device Operating System and Web browser information, visitor location information, visitor Internet connection type information, information related to Web pages visited during the current visit, information related to time spent on each visited Web page and information related to content accessed on each visited Web page.

12. An apparatus, comprising:
a memory for storing instructions; and
a processor configured to execute the instructions and thereby cause the apparatus to at least perform:
receive information related to a visitor and a current activity of the visitor on an online enterprise channel in substantially real-time;
transform the received information to generate transformed data corresponding to the visitor and the current activity of the visitor on the online enterprise channel;
extract a plurality of features from the transformed data;
using the plurality of features, determine whether a treatment from among a plurality of treatments when rendered to the visitor is capable of increasing a likelihood of the visitor performing a desired action during a current visit of the visitor to the online enterprise channel;
select the treatment for the visitor when it is determined that the treatment is capable of increasing the likelihood of the visitor performing the desired action during the current visit;
render the selected treatment to the visitor during the current visit of the visitor to the online enterprise channel; and
not render treatment to the visitor during the current visit when it is determined that no treatment from among the plurality of treatments is capable of increasing the likelihood of the visitor performing the desired action;
wherein the treatment corresponds to displaying a banner advertisement to the visitor during the current visit of the visitor to the online enterprise channel, wherein the banner advertisement is to be displayed on the online enterprise channel for a first time;
wherein the apparatus is further caused to:
extract one or more features from the banner advertisement;
add the one or more features to the plurality of features extracted from the transformed data to configure a set of features;
generate a first probability score based, at least in part, on the set of features, the first probability score indicative of a probability of the visitor performing the desired action when the banner advertisement is displayed to the visitor during the current visit on the online enterprise channel;
generate a second probability score based, at least in part, on the set of features, the second probability score indicative of a probability of the visitor performing the desired action when the banner advertisement is not displayed to the visitor during the current visit on the online enterprise channel;
compare a difference between the first probability score and the second probability score with a predefined threshold value derived at least in part based on a default banner advertisement;

determine displaying the banner advertisement to be capable of increasing the likelihood of the visitor performing the desired action on the online enterprise channel when the difference is greater than the predefined threshold value; and determine displaying the banner advertisement to be incapable of increasing the likelihood of the visitor performing the desired action on the online enterprise channel when the difference is less than or equal to the predefined threshold value.

13. The apparatus of claim 12, wherein the apparatus is further caused to perform for each treatment from among the plurality of treatments:

generate a first probability score based, at least in part, on the plurality of features, the first probability score indicative of a probability of the visitor performing the desired action on the online enterprise channel when rendered respective treatment from among the plurality of treatments;

generate a second probability score based, at least in part, on the plurality of features, the second probability score indicative of a probability of the visitor performing the desired action on the online enterprise channel when the visitor is not rendered the respective treatment; and compare a difference between the first probability score and the second probability score with a predefined threshold value.

14. The apparatus of claim 13, further comprising:

identify the respective treatment to be capable of increasing the likelihood of the visitor performing the desired action on the online enterprise channel when the difference is greater than the predefined threshold value; and determine the respective treatment to be incapable of increasing the likelihood of the visitor performing the desired action on the online enterprise channel when the difference is less than or equal to the predefined threshold value.

15. The apparatus of claim 14, further comprising:

select the treatment to be rendered to the visitor from among one or more treatments from among the plurality of treatments, the one or more treatments identified to be capable of increasing the likelihood of the visitor performing the desired action on the online enterprise channel.

16. The apparatus of claim 15, further comprising:

select the treatment from among the one or more treatments associated with the highest difference over corresponding predefined threshold value as the treatment to be rendered to the visitor during the current visit to the online enterprise channel.

* * * * *